US009445095B1

(12) United States Patent
Wheelock

(10) Patent No.: US 9,445,095 B1
(45) Date of Patent: Sep. 13, 2016

(54) COMPRESSION OF MODIFIED DATA CAPTURES FOR PACKETS WITH ENCRYPTED OR NON-INTERESTING CONTENT

(71) Applicant: Ian G. Wheelock, Cork (IE)

(72) Inventor: Ian G. Wheelock, Cork (IE)

(73) Assignee: ARRIS Enterprises, Inc., Suwanee, GA (US)

( * ) Notice: Subject to any disclaimer, the term of this patent is extended or adjusted under 35 U.S.C. 154(b) by 423 days.

(21) Appl. No.: 13/646,899

(22) Filed: Oct. 8, 2012

Related U.S. Application Data

(60) Provisional application No. 61/544,166, filed on Oct. 6, 2011.

(51) Int. Cl.
*H04N 19/85* (2014.01)

(52) U.S. Cl.
CPC .................... *H04N 19/00903* (2013.01)

(58) Field of Classification Search
CPC ............. H04N 19/91; H04N 19/00903
USPC .................................................. 375/240
See application file for complete search history.

(56) References Cited

U.S. PATENT DOCUMENTS

| | | | | |
|---|---|---|---|---|
| 7,376,233 B2 * | 5/2008 | Candelore | ............ | H04N 7/162 380/217 |
| 7,706,538 B1 * | 4/2010 | Hughes | ............ | H04L 9/00 380/269 |
| 7,853,980 B2 * | 12/2010 | Pedlow, Jr. | ............ | H04N 7/17318 725/88 |
| 7,908,627 B2 * | 3/2011 | Ansari | ............ | H04N 7/163 375/240 |
| 7,962,741 B1 * | 6/2011 | Alexander | ............ | H04L 63/0485 709/230 |
| 8,645,988 B2 * | 2/2014 | Candelore | ............ | H04N 5/4401 725/32 |
| 8,818,896 B2 * | 8/2014 | Candelore | ............ | H04L 9/0861 705/51 |
| 8,930,718 B2 * | 1/2015 | Aylward | ............ | G11B 20/00086 380/200 |
| 2003/0188192 A1 * | 10/2003 | Tang | ............ | H04L 63/0263 726/13 |
| 2005/0060543 A1 * | 3/2005 | Anspach | ............ | H04K 1/00 713/165 |
| 2005/0141713 A1 * | 6/2005 | Genevois | ............ | H04L 63/0428 380/239 |
| 2007/0053303 A1 * | 3/2007 | Kryuchkov | ............ | H04L 1/20 370/250 |
| 2007/0091886 A1 * | 4/2007 | Davis | ............ | H04W 28/06 370/389 |
| 2007/0124645 A1 * | 5/2007 | Ito | ............ | H04L 63/0428 714/758 |
| 2008/0181404 A1 * | 7/2008 | Matsuki | ............ | H04L 63/0435 380/259 |
| 2008/0186866 A1 * | 8/2008 | Morinaga | ............ | H04L 43/0829 370/247 |
| 2008/0247542 A1 * | 10/2008 | Aylward | ............ | G11B 20/00086 380/201 |
| 2008/0273698 A1 * | 11/2008 | Manders | ............ | H04N 5/783 380/200 |
| 2009/0003222 A1 * | 1/2009 | Fukuyama | ............ | H04L 12/2602 370/242 |
| 2010/0135180 A1 * | 6/2010 | Morinaga | ............ | H04L 43/0829 370/252 |
| 2011/0188652 A1 * | 8/2011 | Yamaguchi | ............ | H04N 7/1675 380/210 |
| 2012/0284587 A1 * | 11/2012 | Yu | ............ | G06F 3/0608 714/773 |
| 2013/0322266 A1 * | 12/2013 | Maon | ............ | H04L 41/14 370/252 |
| 2014/0280737 A1 * | 9/2014 | Bicket | ............ | H04L 67/02 709/218 |

* cited by examiner

*Primary Examiner* — Richard Torrente
*Assistant Examiner* — Irfan Habib
(74) *Attorney, Agent, or Firm* — Bart A. Perkins

(57) ABSTRACT

Various methods, systems, and apparatuses can be used to remove uninteresting data from captured data prior to transmission of the captured data for analysis. In some implementations, a compression module is operable to modify capture data by replacing encrypted content with tags, and to compress the resulting modified data using various compression algorithms.

20 Claims, 4 Drawing Sheets

COMPRESSION OF MODIFIED DATA CAPTURES FOR PACKETS WITH ENCRYPTED OR NON-INTERESTING CONTENT

RELATED APPLICATIONS

This application is a non-provisional application claiming the benefit of U.S. Provisional Application Ser. No. 61/544,166, entitled "Compression of Data Captures for Encrypted or Non-Interesting Content," filed on Oct. 6, 2011, which is hereby incorporated herein by reference in its entirety.

TECHNICAL FIELD

This disclosure relates to capturing data for troubleshooting network problems.

BACKGROUND

Troubleshooting analysis of issues associated with equipment, particularly in the case of encrypted and/or uninteresting content, relies on the use of data captures of information that must be collected. Examples of such data captures include, but are not limited to, network traffic captures and video captures. In many scenarios, the actual encrypted and/or uninteresting content collected within the "capture" mechanism cannot be decrypted as decryption keys are not available.

Encrypted content typically has a high level of entropy within the encrypted data. The level of entropy associated within data affects the operation of many data compression algorithms, because these data compression algorithms attempt to reduce data by identifying compressible patterns that can be replaced by shorter symbols. As a result, compressing encrypted content does not necessarily provide any reasonable level of compression gain. In other words, there is little point in compressing encrypted content. The same is also true of payload data carried within TCP/UDP/HTTP/ETC protocols, where the information is of a binary format that has a sufficiently high entropy that normal compression is not very effective. Thus, there is a need for systems that operate more efficiently with respect to capturing data for troubleshooting analysis.

DETAILED DESCRIPTION

In some implementations of this disclosure, systems and methods can be applied to clear/control and encrypted and/or uninteresting content that is collected, where the encrypted and/or uninteresting content is not useable or is of no use in subsequent troubleshooting analysis. In some implementations, the actual encrypted and/or uninteresting content can be removed entirely from the collected content, and can be replaced by "tags" or "hints" within the compressed output. These "tags" or "hints" can be used to recover the "space" occupied by the original encrypted and/or uninteresting content, and can replace the "hints" or "tags" with dummy information for the analysis module. "Tags" can be created to match the encrypted and/or uninteresting content formats and/or to provide the most effective compression. Thus, the data transmitted back to the analysis/troubleshooting module can be more efficiently compressed than encrypted or uninteresting content.

Figure 1:
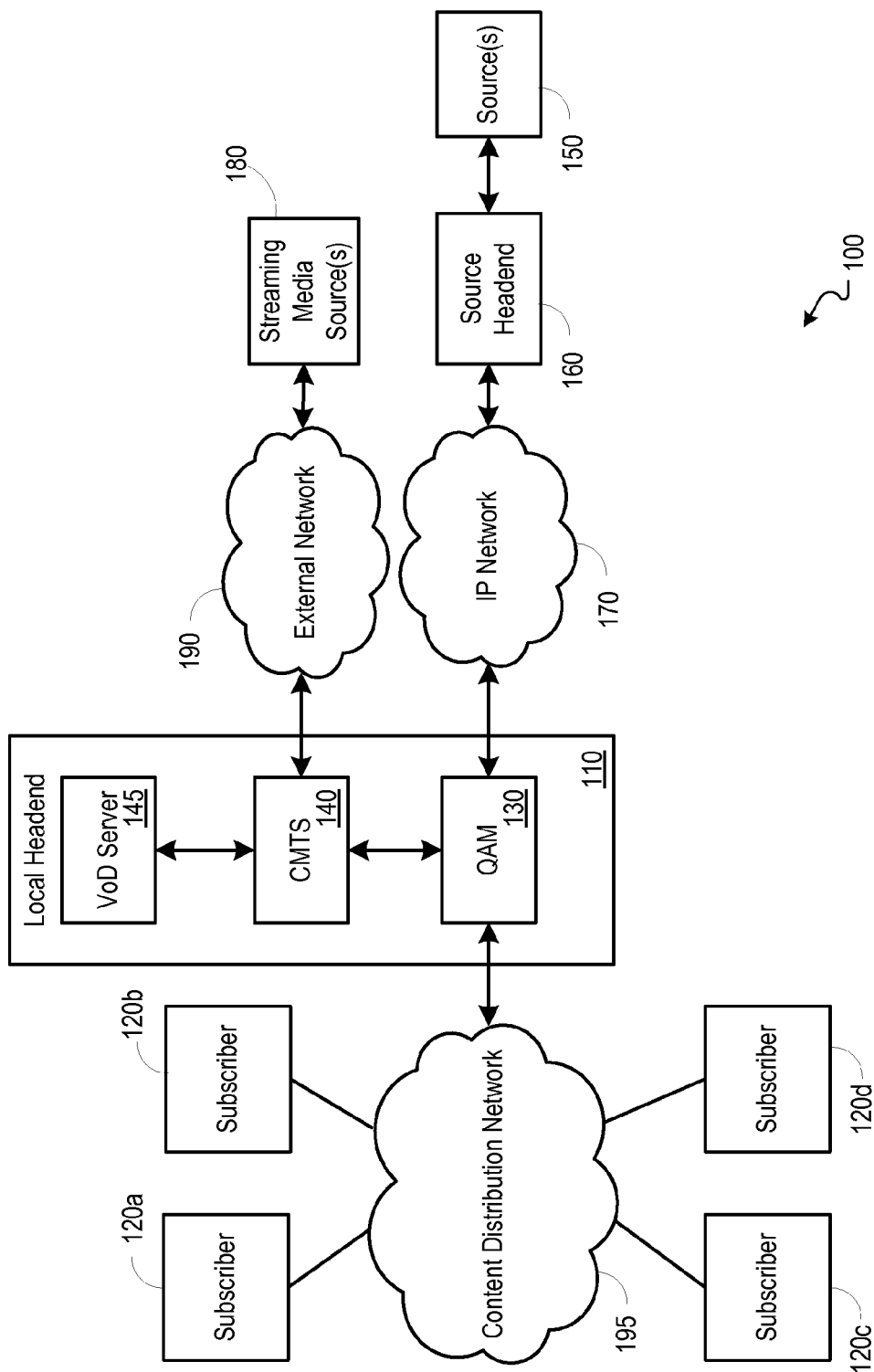
FIG. 1 is a block diagram illustrating an example network environment operable to collect troubleshooting data for analysis.

FIG. 1 is a block diagram illustrating an example network environment operable to collect troubleshooting data for analysis. In some implementations, a headend 110 can provide video, data and/or voice service(s) to one or more subscribers devices 120*a-d* (e.g., cable modem(s), embedded multimedia terminal adapters (EMTAs), set-top box(es), digital subscriber line (DSL) modems, mobile communications devices, etc.). In cable specific implementations, the headend 110 can include devices such as an edge quadrature amplitude modulation (EQAM) device 130 and a cable modem termination system (CMTS) 140. However, it should be understood that in telecommunication-type installations, the headend would be replaced by a central office ("CO"), having a DSL access multiplexer (DSLAM) for multiplexing signals onto twisted pair lines. In still other implementations, video splicers and optical line terminations (OLTs) can be used to insert signals onto fiber lines.

Video streams for distribution to subscriber devices 120*a-d* can be received from a video source (or sources) 150 through a source headend 160 via a network(s) 170 (e.g., including an IP network). In some implementations, these video streams can enter the system as raw moving picture experts group (MPEG) streams, or any other streaming video protocol supported by the headend 110 and/or EQAM device 130.

In other implementations, video streams can be received by the CMTS 140 from a video on demand (VOD) server 145. The VOD server can receive requests for video service via the CMTS, and provide the requested video to the CMTS. The CMTS can address the video to one or more subscribers 120*a-d* and forward the addressed video to the QAM for modulation onto a carrier signal.

Data services can be handled by the headend 110 through a CMTS 140. The CMTS 140 can receive data signals from subscribers 120*a-d* and server(s) 180 through an external network(s) 190 (e.g., including the Internet). The network(s) 190, for example, can operate using Internet protocol (IP), sending data packets to and receiving data packets from the headend 110. In some examples, the CMTS 140 can be paired with a SIP proxy server (not shown) operable to provide voice over internet protocol (VoIP) services with connectivity to the public switched telephone network (PSTN). In still further examples, one or more video sources 150 can provide streaming data through the network(s) 190 to the CMTS 140.

In some implementations, the CMTS 140 can forward received packets to the EQAM device 130 used to modulate the signal onto a carrier waveform. The carrier waveform can include both data and video streams, in both multicast and unicast (e.g., point-to-point) formats for transmission to a combiner, which can combine multiple signals onto a single transmission media (e.g., fiber, coax, etc.) to one or more service groups 120*a-d* via a content distribution network 195 (e.g., a hybrid fiber-coax (HFC) network, digital subscriber line (DSL) network, fiber network, etc.). In other implementations, the CMTS 140 can modulate a baseband signal to a carrier wave and transmit the signal to a combiner for upconversion to a transmission frequency. Again, it should be understood that various other distribution mechanisms and protocol (e.g., PON, EPON, EPOC, RFOG, etc.) can be used and are intended to be included within the scope of the present disclosure.

After ranging and registering with the headend 110, subscriber devices 120*a*-*d* can receive video and data (e.g., computer data and telephony data) from the headend 110 through the content distribution network 195. In some implementations, the subscriber devices 120*a*-*d* can include one or more gateway devices operable to provide an integrated device for video, data and voice services for a subscriber household. The subscriber devices 120*a*-*d* can also (or alternatively) include more traditional digital video recorders and/or set-top boxes. Still further, the subscriber devices 120*a*-*d* can also (or alternatively) include various internet protocol (IP) devices or clients, such as computers, mobile devices, smartphones, tablet computers, IPTV devices, etc.

However, it should be understood that there are occasionally problems with various components or systems within the network or at the customer premises. In such situations, capturing and collecting data associated with the portions of the network having issues is typically useful in diagnosing and correcting the problem(s). However, video traffic on the network is typically encrypted to ensure that non-subscribers are not stealing service from the network, or intercepting traffic intended for other users.

While the majority of encrypted content can only be decrypted by endpoints equipped with the necessary encryption/decryption keys, these encrypted streams also include specific fields of information that are delivered in the "clear" (e.g., unencrypted). In addition to special fields of information associated with the encrypted content, other control information shared between the communication endpoints may also be transmitted in the clear or can be signed (but not unencrypted).

This "clear" content and control content can be invaluable in terms of troubleshooting issues with encrypted and/or uninteresting content. However, the actual encrypted and/or uninteresting content itself is less valuable, and may complicate the actual troubleshooting analysis. In the case of many troubleshooting examples, where content capturing might be performed over long time durations, the amount of captured content maybe significant. Transferring such captured content from a remote site (where the capture was collected) to a site that performs the troubleshooting can be a lengthy process. Those skilled in the art should understand that if the content is encrypted content, a significant portion of the transfer time is associated with data that will be subsequently discarded.

In some implementations, the actual encrypted and/or uninteresting content can be removed completely from the content collected, and can be replaced by "hints" (e.g., tags) within the compressed output to recover the "space" occupied by the original encrypted and/or uninteresting content. The troubleshooting and analysis module can replace these "hints" or "tags" with dummy information. "Hints" can be created to match the encrypted and/or uninteresting content formats and/or to provide the most effective compression.

Figure 2:
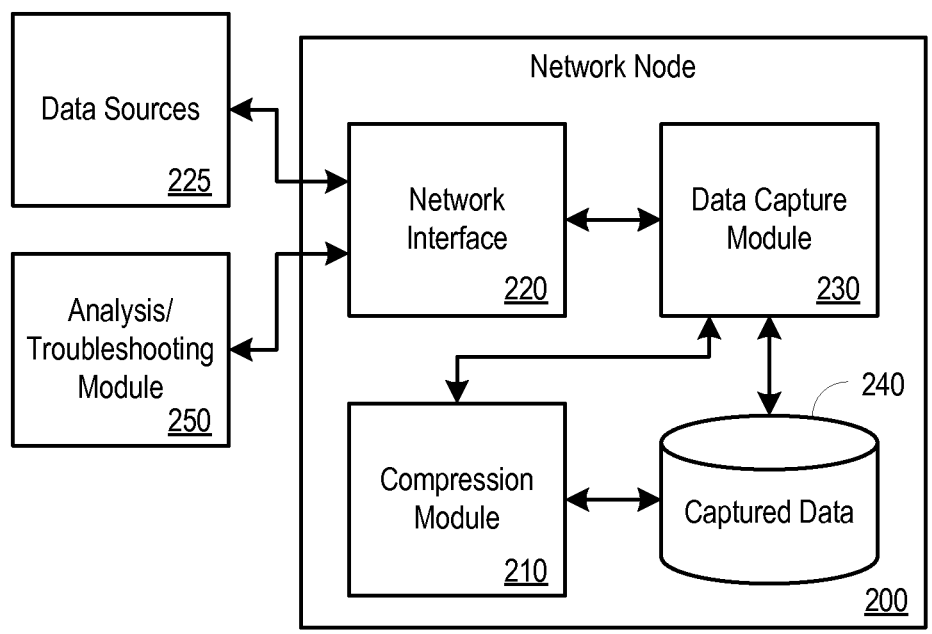
FIG. 2 is a block diagram of a network node having an improved compression module.

FIG. 2 is a block diagram of a network node 200 having an improved compression module 210. The network node 200 can receive data (e.g., transport streams, computer data, telephony traffic, etc.) via a network interface 220. The data can be received from any of a number of various data sources 225 over a network (e.g., content distribution network 195, IP network 170, or external network 190 of FIG. 1). A data capture module 230 on the network node 200 can operate to capture the data received by the network interface to a captured data store 240. The captured data store 240 can store the captured data until the data capture module retrieves the data for transmission to an analysis/troubleshooting module 250.

In some implementations, the improved compression module 210 can operate in batch mode, whereby the captured data stored in the captured data store 240 can be periodically compressed by removing encrypted and uninteresting content from the data stored in the captured data store 240. Thus, for example, once per hour the compression module 210 will identify uncompressed data within the captured data store and compress the data. In various alternative examples, compression can be performed at the conclusion of every session, during periods of low activity, or combinations thereof. The compression module 210 can both operate to remove uninteresting and encrypted data and replace the encrypted/uninteresting data with "hints" or "tags" and then perform an actual compression of the data. In other implementations, the compression module 210 can be used to compress the captured data upon ingestion into the captured data store 240. Such implementations could operation to remove the inefficiency of storing uninteresting or encrypted data for some period of time before the data has been operated on by the compression module 210. In other implementations, the compression module 210 can be instructed to operate upon the data only upon retrieval by the analysis/troubleshooting module 250. In such implementations, the network node 200 can avoid unnecessarily processing (e.g., compressing) captured data that will never be retrieved by the analysis/troubleshooting module 250, thereby conserving processing capabilities. In still other implementations, combinations of any of the above implementations can be provided. For example, the batch compression implementation can be combined with the retrieval compression implementation to ensure that any uncompressed captured data is compressed when it is retrieved by the analysis/troubleshooting module 250. Thus, captured encrypted content will be compressed more efficiently based upon the use for which the captured encrypted content is intended.

One example of such encrypted content compression relates to the collection of MPEG-2 transport stream (TS) content. In order to protect MPEG-2 TS content, conditional access and encryption systems are deployed that result in the encryption of the majority of the MPEG-2 content. Encryption can be defined using a common approach specified in various international standards. This approach can provide that important control information can be made available in the "clear" even when the full MPEG-2 content is encrypted. The MPEG-2 system identifies traffic as encrypted or not-encrypted. Encrypted traffic provides that the MPEG-2 TS "header" (a 4 byte field of data) can be transmitted in the clear. Any "adaptation" field that follows on from the "header" also remains in the clear. The traffic following the header or the adaptation field (if present) is removed before compressing the MPEG-2 TS stream. One other optimization that can be used for MPEG-2 TS streams includes the removal of non-scrambled payload data associated with null packets.

In the case of internet protocol (IP) traffic captures, similar implementations can be used, where the payload of the TCP/UDP/HTTP/etc protocol can be removed. The removal of payload information can net a significant bandwidth saving on the compressed version of the captured data. In the example case of a TCP/HTTP packet collected off of Ethernet, a 1,434 byte frame contains 1,380 bytes of payload. Removing this payload information results in an immediate 96.2% savings in bandwidth usage. In a capture of 10 Mbytes of such traffic, the above compression results in only 0.376 Mbytes of traffic. Further, passing the reduced data into any existing or future data compression systems can reduce this bandwidth usage further.

| MPEG-2 TS Example: | | |
|---|---|---|
| Cleartext | | |
| 1. | [HDR-C][PAYLOAD] | [HDR-C][PAYLOAD] |
| 2. | [HDR-C][ADAPTATION] | [HDR-C][ADAPTATION] |
| 3. | [HDR-C][ADAPTATION] [PAYLOAD] | [HDR-C][ADAPTATION] [PAYLOAD] |
| Scrambled | | Compressed |
| 1. | [HDR-S][PAYLOAD] | [HDR-S][RR] |
| 2. | [HDR-S][ADAPTATION] | [HDR-S][ADAPTATION] |
| 3. | [HDR-S][ADAPTATION] [PAYLOAD] | [HDR-S][ADAPTATION] [RR] |

The Scrambled (1) and (3) data types can be transformed into the compressed formats. The [RR] can be used as an optional place holder (if necessary) in the future for replacement fields.

The benefits of such a scheme can be identified by the following example case:

An original MPEG-2 TS capture file was created using a PCAP capture file:
  84,543,618 17 Jun 09:31 mpeg-2-ts.pcap
  Compressing this file using a normal "gnuzip" compression tool results in the following
  71,091,506 17 Jun 09:31 mpeg-2-ts.pcap.gz
  Once the MPEG-2 TS content is extracted into a raw TS file, the size reduces by a small amount.
  80,974,796 24 Jun 15:32 mpeg-2-ts
However, once the MPEG-2 TS encryption compressor function is applied to the MPEG-2 TS file, it shrinks significantly.
  18,521,709 24 Jun 15:42 mpeg-2-ts-enc-comp (compared to 84,543,618)
  With the file in this format, the "gnuzip" compression is applied again.
  5,417,584 24 Jun 15:42 mpeg-2-ts-enc-comp.gz Those skilled in the art will immediately understand that an implementation of the disclosed compression scheme used in this example results in a 93.6% reduction in size from the original PCAP capture file. Compared to the compressed PCAP capture file, the compression reduction is 76.2%

The decompression of this compressed data can operate to reinstate the removed data with random information in the same place. Because the encrypted data that was removed was never "useful" since it could not be decrypted, the reinstatement of random data in this location returns the captured content to a recognizable, and usable state for the purpose of troubleshooting analysis.

The compression/decompression approach described herein can also be applied to IPSEC traffic and to other "contained" encryption protocols.

For example, a sample algorithm for removing uninteresting/encrypted content can include the code:

```
if (globalArgs.compressOutput==TRUE){
  p=0; /* DEALING with MULTIPLE MPEG Packets in a UDP frame *
  while (p<packet_length/188){
    packetBuffer=pkt_ptr; /* get start of MPEG packet */
    ScrambleCtl=((packetBuffer[3] & 0xC0)>>6);
    AdaptFieldCtl=((packetBuffer[3] & 0x30)>>4);
    AdaptLength=(packetBuffer[4]);
    if (ScrambleCtl==0){/* if MPEG packet is NOT SCRAMBLED */
      PID=((packetBuffer[1] & 0x1F)<<8)|(packetBuffer[2]);
      if (PID==8191) {/* with NULL PID, simply write out the 4 byte MPEG HDR */
        fwrite(pkt_ptr, 4, 1, tsOutput);
      } else {/* non-scrambled, non-null packet, write out in full */
        fwrite(pkt_ptr, 188, 1, tsOutput);
      }
    } else {
      /* traffic is SCRAMBLED
         find Adaptation length, if Adaptation ctl is set */
      if (AdaptFieldCtl & 0x01) {/* scrambled, payload only, write out 4 byte MPEG HDR */
        fwrite(pkt_ptr, 4, 1, tsOutput);
      } else if (AdaptFieldCtl & 0x03){/* scrambled, adaptation+payload, write out MPEG HDR+ ADAP HDR */
        fwrite(pkt_ptr, 4+AdaptLength, 1, tsOutput);
      }
    }
    pkt_ptr+=188; /* skip to next MPEG packet in sequence */
    p++;
  }
}
```

Figure 3:
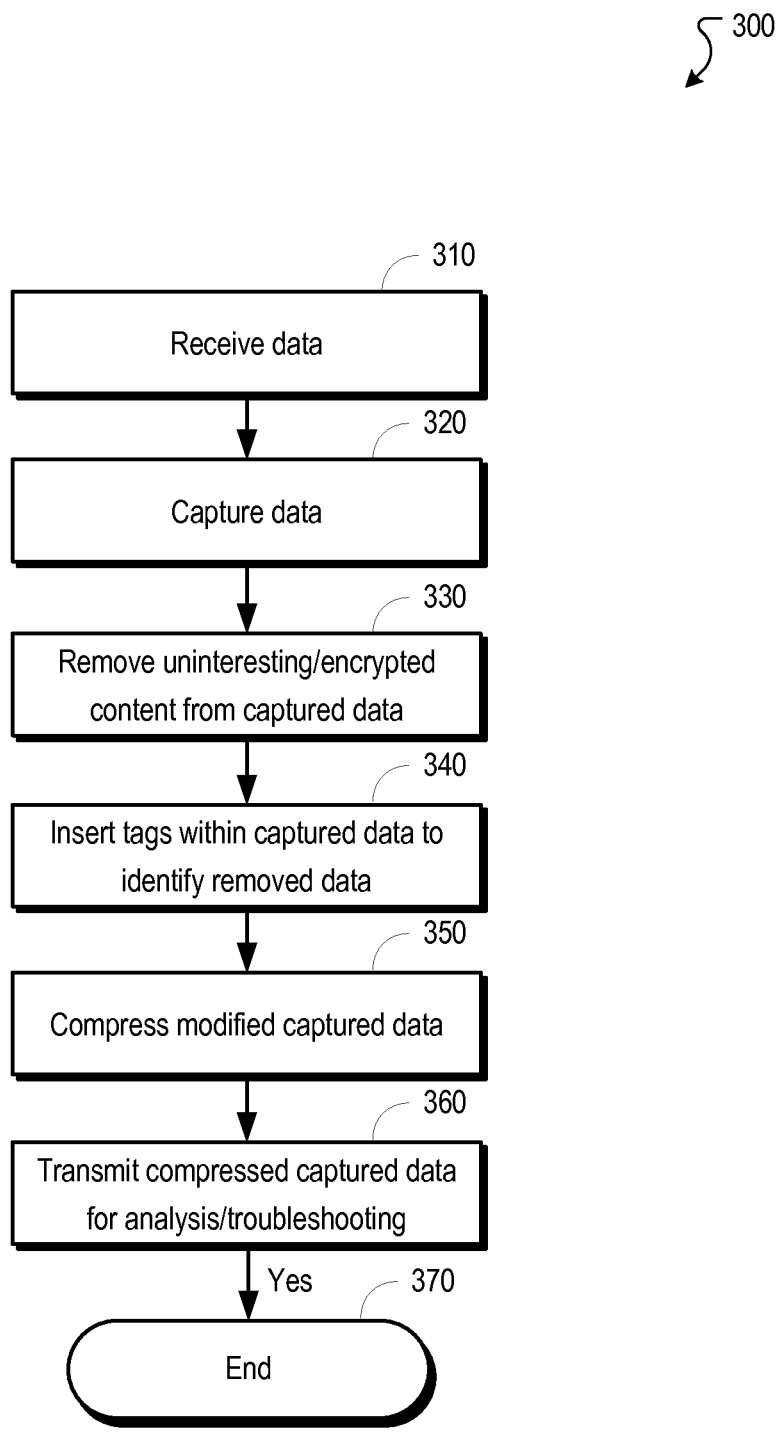
FIG. 3 is a flowchart illustrating an example process 300 used to remove encrypted and/or uninteresting content from captured data prior to transmitting the captured data to an analysis/troubleshooting module.

FIG. 3 is a flowchart illustrating an example process 300 used to remove encrypted and/or uninteresting content from captured data prior to transmitting the captured data to an analysis/troubleshooting module. The process 300 can begin at stage 310, where data is received. The data can be received, for example, by an interface (e.g., network interface 220 of FIG. 2). In various examples, the data can be any of computer data, telephony data, or streaming video data. Various portions of the received data can be encrypted or uninteresting to the analysis, while other portions of the received data can be unencrypted.

At stage 320, the data is captured. The data can be captured, for example, by a data capture module (e.g., data capture module 230 of FIG. 2) in conjunction with a data store (e.g., captured data store 240 of FIG. 2). In some implementations, the data capture module can operate to filter the captured data by filtering out uninteresting data (e.g., data belonging to different sessions or streams than that being analyzed). The data capture module can be a software system operating on a processor within a network node. While the processor processes the data according to handling instructions, the processor can also process the data based on instructions from the data capture module.

At stage 330, encrypted/uninteresting content can be removed from the captured data. Encrypted/uninteresting content can be removed from the captured data, for example, by a compression module (e.g., compression module 210 of FIG. 2). In some implementations, uninteresting data can be removed by the capture module. However, even in such implementations, the compression module can continue to operate to remove any remaining uninteresting data after the operation of the capture module. In some implementations, the compression module can operate to remove encrypted data from the captured data. This encrypted data typically does not compress well and, at any rate, cannot be decrypted by the analysis/troubleshooting module without excessive effort. Thus, this encrypted data is not usable for analysis/troubleshooting efforts. However, place markers for such data should remain in order to facilitate the analysis/troubleshooting.

Thus, at stage 340, tags are inserted within the captured data. Tags can be inserted within the captured data, for example, by a compression module (e.g., compression module 210 of FIG. 2). In some implementations, the compression module can insert tags within the captured data at the same points from which the data was removed. The tags can provide "hints" to identify what type of data was removed, the length of the packet, and other data that can be useful for analysis/troubleshooting.

At stage 350, the modified captured data is compressed. The modified captured data can be compressed, for example, by a compression module (e.g., compression module 210 of FIG. 2). In some implementations, standard compression algorithms can be used to compress the modified data after the encrypted/uninteresting information is removed. These compression algorithms can operate to reduce the size of the modified captured data more efficiently than they would otherwise be able to reduce the size of the unmodified captured data.

At stage 360, the compressed capture data is transmitted for analysis/troubleshooting. The compressed capture data can be transmitted, for example, by a data capture module (e.g., data capture module 230 of FIG. 2) in conjunction with a network interface (e.g., network interface 220 of FIG. 2). The process 300 ends at stage 370.

Figure 4:
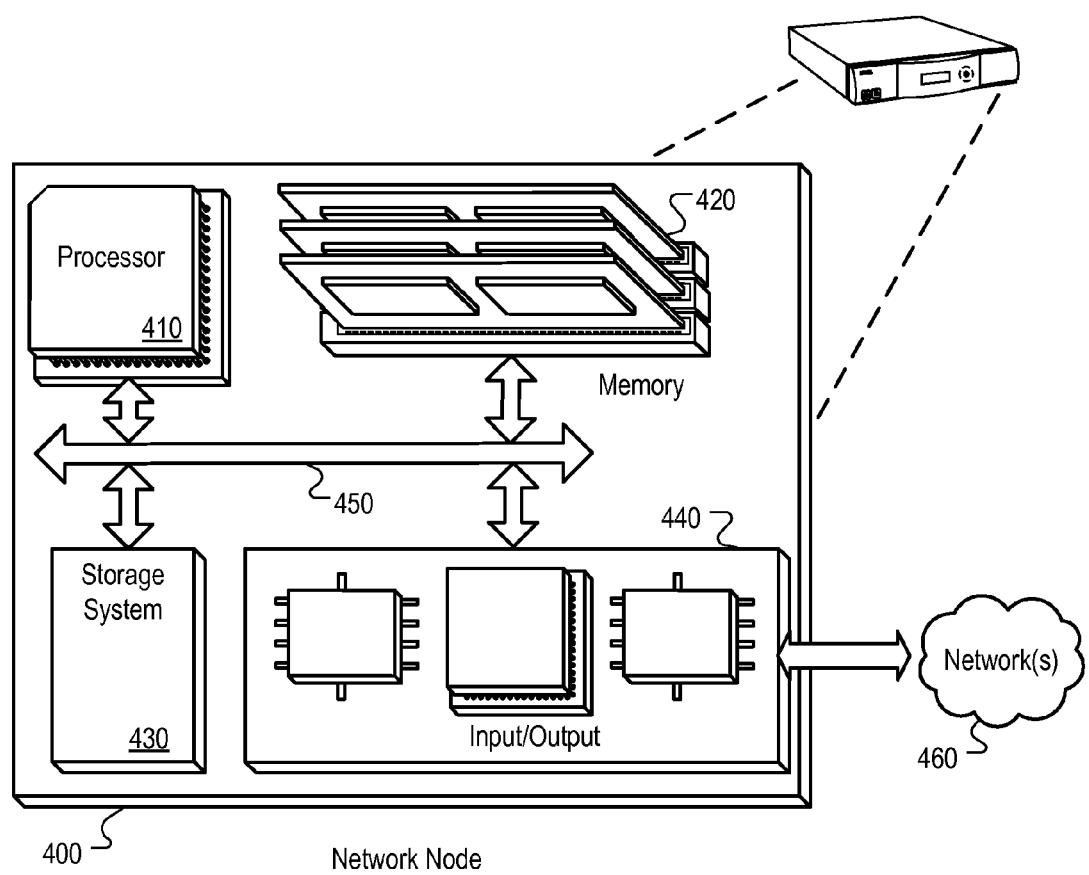
FIG. 4 is a component diagram of an example network node 400 operable to compress encrypted/uninteresting content for analysis/troubleshooting.

FIG. 4 is a component diagram of an example network node 400 operable to compress encrypted/uninteresting content for analysis/troubleshooting. The network node 400 can include a processor 410, a memory 420, a storage device 430, and an input/output device 440. Each of the components 410, 420, 430, and 440 can be interconnected, for example, using a system bus 450. The processor 410 is capable of processing instructions for execution within the network node 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the network node 400. In one implementation, the memory 420 is a computer-readable medium. In one implementation, the memory 420 is a volatile memory unit. In another implementation, the memory 420 is a non-volatile memory unit.

In some implementations, the storage device 430 is capable of providing mass storage for the network node 400. In one implementation, the storage device 430 is a computer-readable medium. In various different implementations, the storage device 430 can include, for example, a hard disk device, an optical disk device, flash memory or some other large capacity storage device.

The input/output device 440 provides input/output operations for the network node 400. In one implementation, the input/output device 440 can interface to a content delivery network 460 or a content source network 470. In addition, such input/output device 440 can communicate with other external devices through various interfaces such as, for example, an IP network interface device, e.g., an Ethernet card, a cellular network interface, a serial communication device, e.g., and RS-232 port, and/or a wireless interface device, e.g., and 802.11 card. In another implementation, the input/output device can include driver devices configured to receive input data and send output data to other input/output devices (e.g., one or more networks 460).

The of compression schemes described in this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can a computer readable medium. The computer readable medium can be a machine readable storage device, a machine readable storage substrate, a memory device, a composition of matter effecting a machine readable instruction, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer-implemented method, comprising:
   capturing data packets at a network device, wherein each captured data packet comprises one or more encrypted portions and one or more unencrypted portions;
   storing the captured data packets to a data store;
   modifying each respective one of the captured data packets, wherein modification of each respective one captured data packet comprises the steps of:
      identifying each of one or more encrypted portions of the respective data packet;
      removing the one or more encrypted portions from the respective data packet; and
      replacing each respective one of the one or more encrypted portions of the respective data packet with tag information, wherein the tag information is unencrypted, is placed within the modified data packet at a location previously occupied by the respective encrypted portion, and comprises an identification of one or more properties of the respective encrypted portion;
   compressing the modified data packets; and
   transmitting the compressed modified data packets to an analysis device.

2. The computer-implemented method of claim 1, wherein the packets are modified and compressed prior to storing the captured data packets to the data store.

3. The computer-implemented method of claim 1, further comprising periodically modifying and compressing the data packets after the captured data packets have been stored to the data store.

4. The computer-implemented method of claim 1, wherein the stored data packets are modified and compressed immediately prior to being transmitted to the analysis device.

5. The computer-implemented method of claim 1, wherein the one or more properties comprises a size associated with the replaced portion of the data packets.

6. The computer-implemented method of claim 1, wherein the one or more properties comprises a type associated with the replaced portion of the data packets.

7. The computer-implemented method of claim 1, wherein the tag information used to replace the encrypted portions of the captured data packets is optimized to achieve a maximum compression ratio.

8. The computer-implemented method of claim 1, further comprising:
   reconstructing the compressed data packets to produce reconstructed data packets by:
      decompressing the compressed data packets; and
      inserting random information into the portions of the data packets identified by the tag information; and
   analyzing the reconstructed data packets.

9. A system, comprising:
   a data capture module operable to instruct a network node to capture data packets received at the network node, wherein each captured data packet comprises one or more encrypted portions and one or more unencrypted portions;
a data store operable to store the captured data packets;
a compression module operable to:
   modify each respective one of the captured data packets, wherein modification of each respective one captured data packet comprises:
      identifying each of one or more encrypted portions of the respective data packet;
      removing the one or more encrypted portions from the respective data packet; and
      replacing each respective one of the one or more encrypted portions of the respective data packet with tag information, wherein the tag information is unencrypted, is placed within the modified data packet at a location previously occupied by the respective encrypted portion, and comprises an identification of one or more properties of the respective encrypted portion; and
   compress the modified data packets;
the data capture module being further operable to transmit the compressed modified data packets to an analysis device.

10. The system of claim 9, wherein the compression module is operable to modify and compress the captured data packets prior to storing the captured data packets to the data store.

11. The system of claim 9, wherein the compression module is operable to periodically modify and compress the data packets after the captured data packets have been stored to the data store.

12. The system of claim 9, wherein the compression module is operable to modify and compress the stored data packets immediately prior to the packets being transmitted to the analysis device.

13. The system of claim 9, wherein the tag information used to replace the encrypted portions of the captured data packets is optimized to achieve a maximum compression ratio.

14. The system of claim 9, further comprising an analysis module operable to reconstruct the compressed data packets to produce reconstructed data packets by decompressing the compressed data packets, and inserting random information into the portions of the data packets identified by the tag information, and wherein the analysis module is further operable to analyze the reconstructed data packets to identify problems within the network.

15. One or more computer-readable media operable to be executed by one or more computer processors, the computer-readable media, upon execution by the one or more computer processors being operable to cause the one or more computer processors to:
   capture data packets at a network device, wherein each captured data packet comprises one or more encrypted portions and one or more unencrypted portions;
   store the captured data packets to a data store;
   modify each respective one of the captured data packets, wherein modification of each respective one captured data packet comprises the steps of:
      identifying each of one or more encrypted portions of the respective data packet;
      removing the one or more encrypted portions from the respective data packet; and
      replacing each respective one of the one or more encrypted portions of the respective data packet with tag information, wherein the tag information is unencrypted, is placed within the modified data packet at a location previously occupied by the respective encrypted portion, and comprises an identification of one or more properties of the respective encrypted portion;
   compress the modified data packets; and
   transmit the compressed modified data packets to an analysis device.

16. The one or more computer readable media of claim 15, further operable to cause the one or more processors to:
   reconstruct the compressed data packets to produce reconstructed data packets by:
      decompressing the compressed data packets; and
      inserting random information into the portions of the data packets identified by the tag information; and
   analyze the reconstructed data packets.

17. The system of claim 9, wherein the one or more properties comprises a size associated with the replaced portion of the data packets.

18. The system of claim 9, wherein the one or more properties comprises a type associated with the replaced portion of the data packets.

19. The one or more computer readable media of claim 15, wherein the one or more properties comprises a size associated with the replaced portion of the data packets.

20. The one or more computer readable media of claim 15, wherein the one or more properties comprises a type associated with the replaced portion of the data packets.

* * * * *